(12) United States Patent
Kretzschmar et al.

(10) Patent No.: US 8,029,888 B2
(45) Date of Patent: Oct. 4, 2011

(54) PREPARATION OF TRANSPARENT HIGH DENSITY POLYETHYLENE SHEETS

(75) Inventors: Eike Kretzschmar, Zwingenberg (DE); Michael D. Wolkowicz, Newark, DE (US); Johannes-Friedrich Enderle, Frankfurt (DE); Dieter Lilge, Limburgerhof (DE)

(73) Assignee: Basell Polyolefine GmbH, Wesseling (DE)

( * ) Notice: Subject to any disclaimer, the term of this patent is extended or adjusted under 35 U.S.C. 154(b) by 629 days.

(21) Appl. No.: 12/215,765

(22) Filed: Jun. 30, 2008

(65) Prior Publication Data

US 2009/0324918 A1 Dec. 31, 2009

(51) Int. Cl.
*B32B 27/32* (2006.01)
*C08F 110/02* (2006.01)
*B29C 55/04* (2006.01)
*C08J 5/18* (2006.01)

(52) U.S. Cl. ......... 428/220; 526/352; 264/291; 264/210

(58) Field of Classification Search .................. 526/352; 264/210.1, 291
See application file for complete search history.

(56) References Cited

U.S. PATENT DOCUMENTS

| | | | | |
|---|---|---|---|---|
| 4,590,020 A | * | 5/1986 | Itaba et al. | 264/471 |
| 4,891,173 A | * | 1/1990 | Saitoh et al. | 264/470 |
| 4,954,391 A | * | 9/1990 | Kotani et al. | 428/220 |
| 5,006,378 A | * | 4/1991 | Itaba et al. | 428/34.9 |
| 7,011,892 B2 | * | 3/2006 | Breese | 428/523 |
| 7,078,081 B2 | | 7/2006 | Breese | 428/36.92 |
| 2003/0030174 A1 | * | 2/2003 | Gray et al. | 264/171.28 |

FOREIGN PATENT DOCUMENTS

| | | | |
|---|---|---|---|
| EP | 0 097 008 A1 | * | 12/1983 |
| JP | 51-34956 | | 9/1974 |
| JP | 51-30278 | * | 3/1976 |
| JP | 51-34956 | * | 3/1976 |
| JP | 53-130768 | | 4/1977 |
| JP | 54-43274 A | * | 4/1979 |
| JP | 63-199242 A | * | 8/1988 |
| JP | 3-277528 A | * | 12/1991 |
| JP | 10-323892 | | 5/1997 |
| JP | 2003-276081 | * | 9/2003 |
| JP | 2006-348197 A | * | 12/2006 |
| WO | WO 2004/085522 A1 | * | 10/2004 |
| WO | WO 2005/047387 A1 | * | 5/2005 |

OTHER PUBLICATIONS

Oomura et al., JP 51-30278 (Mar. 1976) translation in English.*

* cited by examiner

*Primary Examiner* — Rip A. Lee
(74) *Attorney, Agent, or Firm* — Dilworth IP, LLC

(57) ABSTRACT

A transparent high density polyethylene (HDPE) sheet is disclosed. The sheet has a thickness greater than or equal to 0.05 mm and a bulk haze less than 2%. The HDPE resin is converted into a sheet by thermal processing and the sheet is then uniaxially oriented at a temperature above the melting point of the HDPE resin. The transparent HDPE sheet of the invention can be used for windows and plastic containers.

9 Claims, No Drawings

PREPARATION OF TRANSPARENT HIGH DENSITY POLYETHYLENE SHEETS

FIELD OF THE INVENTION

The invention relates to the preparation of polyethylene sheets. More particularly, the invention relates to the preparation of transparent high density polyethylene sheets.

BACKGROUND OF THE INVENTION

Transparent plastic sheets are particularly valuable. For instance, poly(methyl methacrylate) (PMMA) and polycarbonate (PC) sheets are widely used in windows and glass lenses. However, PMMA and PC sheets are expensive. High density polyethylene (HDPE) sheets, like PMMA and PC sheets, have high physical strength, rigidity, and impact resistance. But HDPE sheets are translucent and therefore they cannot be used in windows.

JP 10323892 discloses a method for improving transparency and mechanical strength of polyolefin sheets. The method involves biaxially stretching an HDPE sheet and subsequently compressing the sheet at a temperature within the range of 25° C. below the melting point of the HDPE to 5° C. above the melting point of the HDPE.

JP 53130768 discloses HDPE cups. An HDPE resin is extruded at 210° C. into a sheet of 400 mm wide and approximately 0.9 mm thick, drawn 200% at 122±0.5° C. to give a sheet of 305μ thick and molded to give a cup with Haze value of 16-22%.

JP 51034956 discloses a transparent polyethylene container. A polyethylene sheet containing 70-99.9% of HDPE and 0.1-30% LDPE is heated to a temperature within the range of 5° C. to 35° C. below the melting point of the HDPE and molded with a plug at a temperature below the melting point of the HDPE at a rate less than 500 mm/sec to a draw ratio of 5-15 to give a transparent container.

Although many efforts have been made to increase the transparency of HDPE sheets, highly transparent HDPE sheets which can be used for windows are not available.

SUMMARY OF THE INVENTION

The invention is a transparent high density polyethylene (HDPE) sheet. The transparent HDPE sheet has a bulk haze less than 2% and a thickness greater than or equal to 0.05 mm. The invention includes a method for preparing the transparent HDPE sheet. The method comprises uniaxially orienting a thick HDPE sheet at a temperature above the melting point of the HDPE. The transparent HDPE sheet of the invention can be used in windows, sunrooms and greenhouses, and any other places which require the sheet to have both high transparency and physical strength.

DETAILED DESCRIPTION OF THE INVENTION

High density polyethylene (HDPE) resins suitable for making a sheet of the invention preferably have a density within the range of about 0.935 g/cm$^3$ to about 0.97 g/cm$^3$. More preferably, the density is within the range of about 0.94 g/cm$^3$ to about 0.97 g/cm$^3$. Most preferably, the density is within the range of 0.95 g/cm$^3$ to 0.97 g/cm$^3$. Density is measured according to ASTM D4883-03.

Preferably, the HDPE resin has a melt index (MI$_2$) from about 0.03 to about 0.15 dg/min, more preferably from about 0.04 to about 0.15 dg/min, and most preferably from 0.05 to 0.10 dg/min. The MI$_2$ is measured at 190° C. under 2.16 kg of pressure according to ASTM D-1238.

Preferably, the HDPE resin has a number average molecular weight (Mn) within the range of about 10,000 to about 25,000, more preferably from about 12,000 to about 20,000, and most preferably from about 14,000 to about 18,000. Preferably, the HDPE resin has a weight average molecular weight (Mw) within the range of about 100,000 to about 250,000, more preferably from about 150,000 to about 250,000, and most preferably from about 150,000 to about 200,000. Preferably, the HDPE resin has a molecular weight distribution (Mw/Mn) within the range of about 5 to about 20, more preferably from about 5 to about 15, and most preferably from about 8 to about 15. The Mw, Mn and Mw/Mn can be obtained by gel permeation chromatography. The molecular weights and molecular weight distribution are measured according to ASTM D6474-99 (2006).

Preferably, the HDPE resin is an ethylene homopolymer or copolymer that comprises from about 90 wt % to about 99 wt % of recurring units of ethylene and from about 1 wt % to about 10 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene, and the like, and mixtures thereof. Suitable HDPE resins can be produced by Ziegler-Natta or Phillips catalysts or single-site catalysts.

The HDPE resin is converted into a thick sheet by thermal processing or any other suitable method. Preferably, the thick sheet is made by sheet extrusion or compression. The thick HDPE sheet has a thickness preferably greater than 0.1 mm, more preferably greater than 0.25 mm, and most preferably greater than 0.5 mm.

The thick HDPE sheet is then uniaxially oriented to a thinner sheet. The ratio of the sheet thickness before and after orientation is called "drawdown ratio." For example, when a 1 mm sheet is oriented to 0.5 mm, the drawdown ratio is 2. Preferably, the drawdown ratio is within the range of about 2 to about 15, more preferably about 4 to about 8, and most preferably about 5 to about 6.

The HDPE thick sheet is then put into the stretching oven and heated until the orientation temperature is achieved. The orientation temperature is above the melting point of the HDPE. Preferably, the orientation temperature is within the range of about 5° C. above to about 35° C. above the melting point of the HDPE. More preferably, the orientation temperature is within about 5° C. above to about 20° C. above the melting point of the HDPE. The heated thick sheet is stretched uniaxially to a desired drawdown ratio at the orientation temperature.

The stretching rate is preferably within the range of about 1 cm/sec to about 20 cm/sec. More preferably, the stretching rate is within the range of about 1 cm/sec to about 10 cm/sec. Most preferably, the stretching rate is within the range of about 2 cm/sec to about 8 cm/sec. After stretching, the sheet is cooled to room temperature.

The orientation can be performed batchwise, i.e., in a sheet-by-sheet process. In this process, the HDPE resin is extruded or compression-molded into thick sheets. The thick sheets are then uniaxially stretched one at a time. The thick sheets can also be stored and oriented at a later convenient time. The sheet-by-sheet process is particularly suitable for making transparent HDPE sheets that are thick and rigid.

Alternatively, the uniaxial orientation can be performed in a machine using a process called machine-direction orientation (MDO). In MDO, the thick HDPE sheet is heated on one or more heating rolls to the orientation temperature. The heated sheet is fed into a slow draw roll with a nip roller, which has the same rolling speed as the heating rollers. The sheet then enters a fast draw roll. The fast draw roll has a speed that is 2 to 15 times faster than the slow draw roll, which effectively stretches the sheet on a continuous basis.

The stretched sheet then enters annealing thermal rollers, which allow stress relaxation by holding the sheet at a temperature close to the orientation temperature for a period of time. Finally, the sheet is cooled through cooling rollers to the ambient temperature. The MDO method is more suitable for making a relatively thin and bendable sheet.

The haze is measured, in this invention, by both bulk haze and surface haze. Bulk haze is a measurement of the haze contributed by the mass below the surface. Bulk haze is an important measure of the transparency of sheets because sheets, unlike thin films, have much greater mass below the surface than the mass on the surface. Low bulk haze value means that the sheet may remain high transparency even with a high thickness.

Bulk haze is measured according to a modified ASTM D1003, Standard Test Method for Haze and Luminous Transmittance of Transparent Plastics, October 1992. Testing is performed on the sheet samples using a GYK-Gardner Haze-Gard instrument and PN01347 program. Samples are immersed in a 5 mm cuvette purchased from BYK-Gardner. Immersion fluid is Cargill type A immersion oil with a refractive index of 1.515 to 1.818. The cuvette is filled with the immersion fluid and this assemblage is used to calibrate the instrument. The sheet samples are cut to fit into the calibrated cuvette and the haze values of the sheet samples are read by the instrument and reported herein as the bulk haze. The surface haze is the total haze minus the bulk haze. The total haze is measured according to ASTM D1003.

The method of the invention produces a transparent HDPE sheet. The transparent HDPE sheet has a bulk haze less than 2%, preferably less than 1%. Preferably, the transparent sheets of the invention have a total haze less than 15%, more preferably less than 10%. The transparent HDPE sheet has a thickness greater than or equal to 0.05 mm, preferably greater than or equal to 0.1 mm, more preferably greater than or equal to 0.5 mm, and most preferably greater than or equal to 1 mm. The thickness of the sheets depends on the applications. For instance, sheets for windows are preferably thicker than sheets for plastic containers. Preferably, the thickness of the sheet of the invention is within the range of 0.05 mm to 15 mm, more preferably within the range of 0.1 mm to 5 mm, and most preferably within the range of 0.5 mm to 2.5 mm.

The sheet of the invention retains high rigidity and physical strength. Preferably, the oriented film has MD modulus greater than or equal to 4200 MPa, MD tensile strength at yield greater than or equal to 180 MPa, and MD elongation at yield greater than or equal to 8%. More preferably, MD tensile strength at break is greater than or equal to 130 MPa, and MD elongation at break is greater than or equal to 24%. Preferably, the oriented film has TD (transverse direction) modulus greater than or equal to 900 MPa, TD tensile strength at yield greater than or equal to 33 MPa, TD elongation at yield greater than or equal to 5%, TD tensile strength at break greater than or equal to 38 MPa, and TD elongation at break greater than or equal to 940%. Tensile strength is tested according to ASTM D-882. Modulus is tested according to ASTM E-111-97.

Due to its combination of excellent transparency and physical strength, the transparent HDPE sheets of the invention can replace traditional glass sheets, polycarbonate sheets, and acrylic sheets in many applications. For instance, the transparent HDPE sheets of the invention can be used for windows in buildings and automobiles. The transparent sheets of the invention can also be used for making transparent containers. Compared with glass sheets, the transparent HDPE sheets have much higher impact resistance. Compared with polycarbonate sheets and acrylic sheets, the transparent HDPE sheets have better hydrolytically stability and moisture vapor and oxygen barrier properties.

The following examples merely illustrate the invention. Those skilled in the art will recognize many variations that are within the spirit of the invention and scope of the claims.

EXAMPLE 1

A high density polyethylene (Lupolen 5021 DX, product of Basell Polyolefins) having an HLMI of 23 dg/min (ISO 1183-1), density of 0.957 g/cm$^3$ (ISO 1183-1), Mw/Mn of 11 (GPC ASTM D6474-99), and melting point of 134° C. is molded into a sheet by compression. The sheet has a thickness of 0.4 mm, bulk haze of 98.2%, and surface haze of 1.0%.

The compressed sheet is heated in an oven at 140° C. for 35 seconds, stretched uniaxially to a thickness of 0.08 mm (drawdown ratio: 5:1) at a rate of about 5 cm/sec, and then cooled to ambient temperature (25° C.). The stretched sheet appears very clear, and it has a bulk haze of 0.57% and surface haze of 6.2%.

EXAMPLE 2

A high density polyethylene (Lupolen 3621D, product of Basell Polyolefins) having an HLMI of 20 dg/min, density of 0.936 g/cm$^3$, Mw/Mn of 15, and melting point of 128° C. is molded into a sheet by compression. The sheet has a thickness of 0.4 mm, bulk haze of 100%, and surface haze of 0%.

The compressed sheet is heated in an oven at 140° C. for 35 seconds, stretched uniaxially to a thickness of 0.08 mm (drawdown ratio: 5:1) at a rate of about 5 cm/sec, and then cooled to ambient temperature. The stretched sheet appears very clear, and it has a bulk haze of 0.52% and surface haze of 6.7%.

EXAMPLE 3

A high density polyethylene (LP 4261AG, product of Basell Polyolefins) having an HLMI of 6 dg/min, density of 0.945 g/cm$^3$, Mw/Mn of 15, and melting point of 132° C. is molded into a sheet by compression. The sheet has a thickness of 0.4 mm, bulk haze of 70.3%, and surface haze 26.8%.

The compressed sheet is heated in an oven at 140° C. for 35 seconds, stretched uniaxially to a thickness of 0.08 mm (drawdown ratio: 5:1) at a rate of about 5 cm/sec, and then cooled to ambient temperature. The stretched sheet appears very clear, and it has a bulk haze of 0.75% and surface haze of 6.2%.

EXAMPLE 4

A high density polyethylene (LP 3721C, product of Basell Polyolefins) having an HLMI of 12.5 dg/min, density of 0.937 g/cm$^3$, Mw/Mn of 15, and melting point of 128° C. is molded into a sheet by compression. The sheet has a thickness of 0.4 mm, bulk haze of 66.5%, and surface haze 23.5%.

The compressed sheet is heated in an oven at 140° C. for 35 seconds, stretched uniaxially to a thickness of 0.08 mm (drawdown ratio: 5:1) at a rate of about 5 cm/sec, and then cooled to the ambient temperature. The stretched sheet appears very clear, and it has a bulk haze of 0.84% and surface haze of 10.1%.

EXAMPLE 5

A high density polyethylene (LPGX4082, product of Basell Polyolefins) having an HLMI of 130 dg/min, density of 0.951 g/cm$^3$, Mw/Mn of 15, and melting point of 130° C. is molded into a sheet by compression. The sheet has a thickness of 0.4 mm, bulk haze of 72.7%, and surface haze 8.2%.

The compressed sheet is heated in an oven at 140° C. for 35 seconds, stretched uniaxially to a thickness of 0.08 mm (drawdown ratio: 5:1) at a rate of about 5 cm/sec, and then cooled to the ambient temperature. The stretched sheet appears very clear, and it has a bulk haze of 1.2 % and surface haze of 10.6%.

EXAMPLE 6

A high density polyethylene (HI 5431Z, product of Basell Polyolefins) having an HLMI of 2 dg/min, density of 0.945 g/cm$^3$, Mw/Mn of 18, and melting point of 136° C. is molded into a sheet by compression. The sheet has a thickness of 0.4 mm, bulk haze of 91.8%, and surface haze 7.8%.

The compressed sheet is heated in an oven at 140° C. for 35 seconds, stretched uniaxially to a thickness of 0.08 mm (drawdown ratio: 5:1) at a rate of about 5 cm/sec, and then cooled to the ambient temperature. The stretched sheet appears very clear, and it has a bulk haze of 0.72% and surface haze of 7.0%.

EXAMPLE 7

A high density polyethylene (HS ACP5331A, product of Basell Polyolefins) having an HLMI of 6 dg/min, density of 0.953 g/cm$^3$, Mw/Mn of 20, and melting point of 133° C. is molded into a sheet by compression. The sheet has a thickness of 0.4 mm, bulk haze of 83.6%, and surface haze 11.9%.

The compressed sheet is heated in an oven at 140° C. for 35 seconds, stretched uniaxially to a thickness of 0.08 mm (drawdown ratio: 5:1) at a rate of about 5 cm/sec, and then cooled to ambient temperature. The stretched sheet appears very clear, and it has a bulk haze of 0.42% and surface haze of 7.0%.

TABLE 1

SUMMARY OF EXAMPLES

| | HDPE | | | | Haze Before Orientation, % | | | Haze After Orientation, % | | |
|---|---|---|---|---|---|---|---|---|---|---|
| Ex. No | HLMI | Density | Mw/Mn | MP, ° C. | Bulk | Surface | Total | Bulk | Surface | Total |
| 1 | 23 | 0.957 | 11 | 134 | 98.2 | 1.0 | 99.2 | 0.57 | 6.2 | 6.8 |
| 2 | 20 | 0.936 | 15 | 128 | 100 | 0 | 100 | 0.52 | 6.7 | 7.2 |
| 3 | 6 | 0.945 | 15 | 132 | 70.3 | 26.8 | 97.1 | 0.75 | 6.2 | 7.0 |
| 4 | 12.5 | 0.937 | 15 | 128 | 66.5 | 23.5 | 90.0 | 0.84 | 10.1 | 10.9 |
| 5 | 130 | 0.951 | 15 | 130 | 72.7 | 8.2 | 80.9 | 1.2 | 10.6 | 11.8 |
| 6 | 2 | 0.945 | 18 | 136 | 91.8 | 7.8 | 99.6 | 0.72 | 7.0 | 7.7 |
| 7 | 6 | 0.953 | 20 | 133 | 83.6 | 11.9 | 95.5 | 0.42 | 7.0 | 7.4 |

We claim:

1. A method for making a transparent high density polyethylene sheet, wherein the high density polyethylene has a density of from 0.935 g/cm$^3$ to 0.97 g/cm$^3$, said method comprising uniaxially orienting a high density polyethylene sheet at a temperature above its melting point to produce a sheet having a thickness greater than or equal to 0.05 mm and a bulk haze of less than 2%.

2. The method of claim 1, wherein the bulk haze is less than 1%.

3. The method of claim 1, wherein the temperature is within the range of 5° C. to 20° C. above the melting point.

4. The method of claim 1, wherein the sheet is oriented at a drawdown ratio within the range of 4 to 8.

5. A method comprising converting a high density polyethylene resin having a density of from 0.935 g/cm$^3$ to 0.97 g/cm$^3$, into a sheet and uniaxially orienting the sheet at a temperature above its melting point to produce a sheet having a thickness greater than 0.05 mm and a bulk haze of less than 2%.

6. The method of claim 5, wherein the bulk haze is less than 1%.

7. The method of claim 5, wherein the resin is converted into a sheet by compression.

8. The method of claim 5, wherein the temperature is within the range of 5° C. to 20° C. above the melting point.

9. The method of claim 5, wherein the sheet is oriented at a drawdown ratio within the range of 4 to 8.

* * * * *